United States Patent [19]

Pallucci et al.

[11] 4,237,667

[45] Dec. 9, 1980

[54] METHOD AND APPARATUS FOR INSTALLING GEL MATERIAL IN ARCHITECTURAL BARRIER BREACHES

[75] Inventors: Joseph N. Pallucci, Stone Park; Gregory J. Jarosz, Des Plaines; Glenn R. Kruse, Elk Grove Village, all of Ill.

[73] Assignee: Tech-Sil, Inc., Elk Grove Village, Ill.

[21] Appl. No.: 35,283

[22] Filed: May 2, 1979

[51] Int. Cl.³ .......................... E04F 17/08; E04B 5/48
[52] U.S. Cl. ...................................... 52/221; 52/396; 52/573; 52/743; 248/56; 285/192
[58] Field of Search .............. 52/395, 396, 220, 221, 52/573, 743, 744, 309.1; 16/2; 138/106, 156; 285/46, 47, 192, 294; 126/314; 248/56; 404/47, 66, 67, 69, 48

[56] References Cited

U.S. PATENT DOCUMENTS

| | | | |
|---|---|---|---|
| 784,925 | 3/1905 | Crawford | 52/744 |
| 2,198,084 | 4/1940 | Jacobson | 404/69 |
| 3,914,843 | 10/1975 | Antonacci | 52/220 X |
| 4,086,736 | 5/1978 | Landrigan | 52/221 |

FOREIGN PATENT DOCUMENTS

| | | | |
|---|---|---|---|
| 2551693 | 6/1977 | Fed. Rep. of Germany | 52/221 |
| 585288 | 2/1947 | United Kingdom | 52/395 |
| 863195 | 3/1961 | United Kingdom | 285/192 |

Primary Examiner—Alfred C. Perham
Attorney, Agent, or Firm—Hill, Van Santen, Steadman, Chiara & Simpson

[57] ABSTRACT

A deformable seal for breaches in architectural barriers is composed of a gel material surrounded by a retaining structure. The seal, when used where a member penetrates such a barrier or in a gap between two such barriers allows repeated limited amounts of generally axially movement of the member or barriers while retaining structural continuity and insulating ability.

14 Claims, 8 Drawing Figures

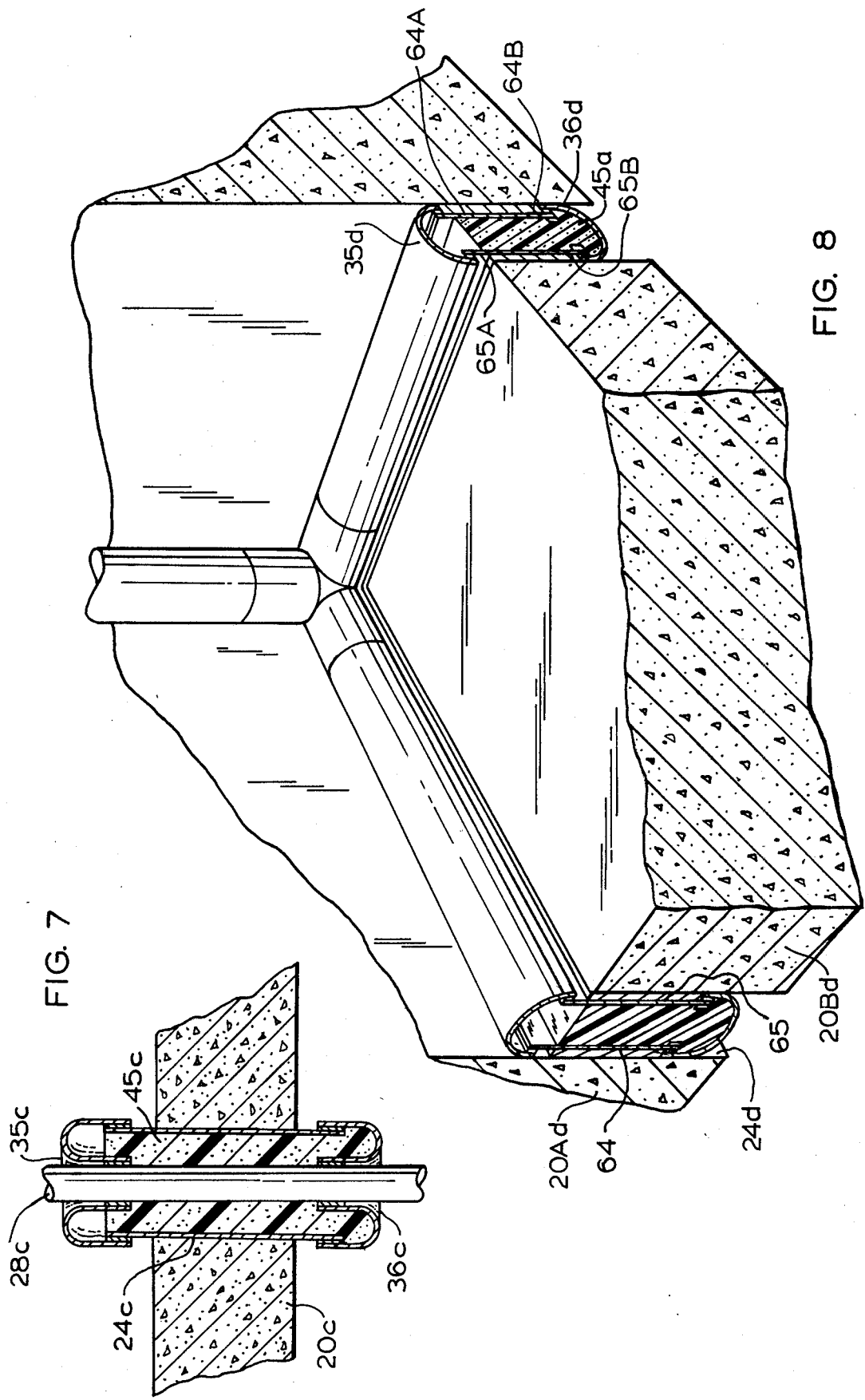

METHOD AND APPARATUS FOR INSTALLING GEL MATERIAL IN ARCHITECTURAL BARRIER BREACHES

BACKGROUND OF THE INVENTION

1. Field of the Invention

This invention relates to a seal, and more particularly to a seal which permits limited multi-directional movement of both the adjacent structure and any member passing through the seal. In addition to permitting multi-directional movement, the integrity of the seal is maintained as against some or all of the following: air or other gases, fire (thermal conduction), water, radiation, shock or vibration between mechanical or architectural components, and sound transfer.

2. Description of the Prior Art

Maintaining a seal between two or more structures or between penetrating members and structures where each member or structure has independent and unrelated movement relative to one another has, in the past, posed a problem to the engineer. This movement may come about for a variety of reasons. For example, when pipes penetrate protective structures there may be mechanical shocks upon start-up or shut-down in addition to any thermal expansion or contraction of the pipe. There may also be seismic considerations wherein it may be desired to provide different rates or directions of movement of the structure and the member. The engineer must allow for these movements and also maintain the desired insulation requirements. A seal possessing the conformability of a liquid with the insulating protection of a solid is required.

In the past, this problem has provided a variety of answers. Annular spaces between members and structures have been packed with materials ranging from loose fiberglass, bulk refractory fiber products, flexible polyurethane products, leaded wools, etc., to lead shot. Seismic gaps and expansion joints were sealed in the same manner. However, these past and present practices represent only partial solutions to this problem.

In most cases, these materials lacked either or both the flexibility and resiliency to allow free movement in any direction while maintaining a seal. Typically, movement caused a packing of the insulating material while further movement resulted in a void between the member or structure and the packed material. This void would usually run the entire length of the member or structure and would continue to expand until it encompassed the entire area in which movement occurred, thereby broaching the insulation.

SUMMARY OF THE PRESENT INVENTION

In accordance with the present invention, there is provided a gel to serve as insulating and shielding material. Since the internal structure of the gel is not strong enough to support itself, an outside frame is used to form a shielding and supporting capsule. The frame consists of a flexible bellow-type form for each end of a rigid container to which it is attached. This container may be formed by the sides of the structure to be sealed or, if this area is inadequate for the attachment of these flexible bellows, a sheet metal sleeve is attached to the structure or substrate and is used for this purpose. Whether existing sleeve extensions permit the attachment of the flexible bellows, (or boots), or where a sheet metal sleeve is installed, the space thereformed acts as a permanent housing for the gel sealing material.

Where the gel is used to seal a penetration for a moving member, the boots function as the vehicle which constrains the gel material and forces it to migrate as the boot is deflected by the moving member. Since the boots are completely flexible, the member may move in any direction while the boot forces the gel to conform to the changing annular configurations.

Where spaces for gaps exist between architectural barriers such as floors or walls, which are required to move in different directions and at different rates, boots of unlimited size or length may be attached to the barriers to span the gaps. The gaps may then be sealed by installing the gel into the void between the boot forms. Since the boots are installed as bellows and the gel material also fills these bellows, there is always a slight surplus of the gel material in the seal. As the architectural barriers move apart from one another, the boot flattens forcing the gel to conform to the new gap configuration. When the barriers move closer together, the architectural barrier forces the gel to migrate, which is then again shaped by the boots.

The present invention remedies the inadequacies inherent in the devices heretofore used. In those devices the very pore space which allows the member to move also serves as a permanent resting place for the insulating materials, especially in view of the weak to nonexistant forces biasing the material against the moving member or structure. The present invention provides for a semi-solid gel which is sufficiently liquid so as to leave no pores but allow some movement, and yet solid enough to offer continuous insulating ability.

BRIEF DESCRIPTION OF THE DRAWINGS

FIG. 7 is a fragmentary cross-sectional view showing an alternate embodiment of the invention.

FIG. 8 is an elevational view, in section, wherein the invention is utilized as a seal between architectural barriers.

DESCRIPTION OF THE PREFERRED EMBODIMENTS

Figure 3:
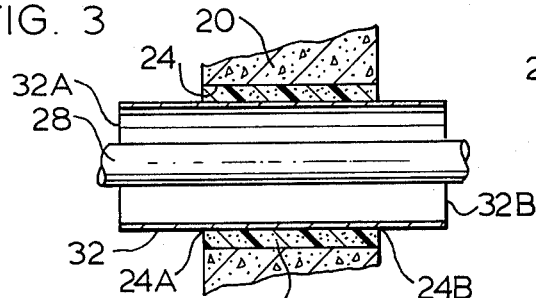
FIG. 3 is a fragmentary cross-sectional view illustrating an initial step in the shielding of a penetration of a shielding structure in accordance with the present invention.

In FIG. 3, an architectural barrier shown generally at 20, for example a wall, has a penetration or opening 24, establishing a through bore, and a moving or movable member 28, shown typically as a pipe, extends therethrough. A cylindrical collar or sleeve 32 surrounds the member 28 in a concentric disposition and extends axially through the penetration 24 and projects outwardly as at 32A and 32B from edges 24A and 24B.

The collar 32 is usually made part of the penetration 24 during the construction or as part of the finishing of the architectural barrier 20, and is typically fabricated from 20 gauge galvanized sheet metal. Where there is no adequate, existing sleeve extension, one may be later constructed out of galvanized sheet metal. In either case the collar 32 is securely cemented in place by means of an annulus of adhesive cement 33, including around the outside edges 24A and 24B. An adhesive cement which is compatible with both masonry and steel substrates shall be used for this purpose. For example, Dow Corning No 790 Silicone Adhesive Cement has been determined to be an appropriate cement for this purpose.

Figure 4:
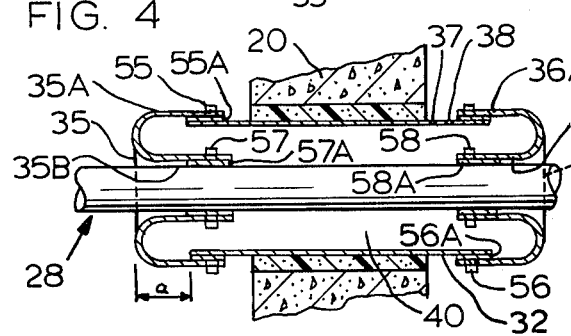
FIG. 4 is a view similar to FIG. 3 but showing a subsequent stage wherein a movable member is disposed in a cavity formed in a penetration of a shielding structure.

As in FIG. 4, the projecting ends 32A and 32B of the collar 32 are then sealed using a flexible, sheet-form damming material which is circumferentially wrapped around both the collar 32 and the member 28, forming boots 35 and 36.

A fiberglass or polyester-reinforced silicone rubber sheet stock material, having an approximate thickness of 0.031 inches (0.79 mm), has been selected as displaying the required heat and radiation stability along with the sealing and strength characteristics required for this application. For example, either Keen Chase-Foster PE-2141 or PE-2325 reinforced silicone rubber sheet stock has been determined to be an appropriate selection.

The collar portion of the boots 35A and 36B is securely attached to the collar 32 by means of a pair of stainless steel clamps 55 and 56 and a layer of adhesive applied to a one to two inch (2.5-5 cm) wide perimeter adjacent to the edge of the collar 32. Similarly, the moving member portion of the boot 35B and 36B is attached to the moving member 28 by means of a pair of stainless steel clamps 57 and 58 with a one to two inch (2.5-5 cm) wide layer of adhesive cement 57A and 58A applied to the member 28. Thus, the collar 32, the moving member 28, and the damming material are joined in a sealed-together relationship forming the boots 35 and 36. The fold or bellow length a, as shown in FIG. 4, of each boot shall be at least equal to the total composite movement of the member 28.

Figure 1:
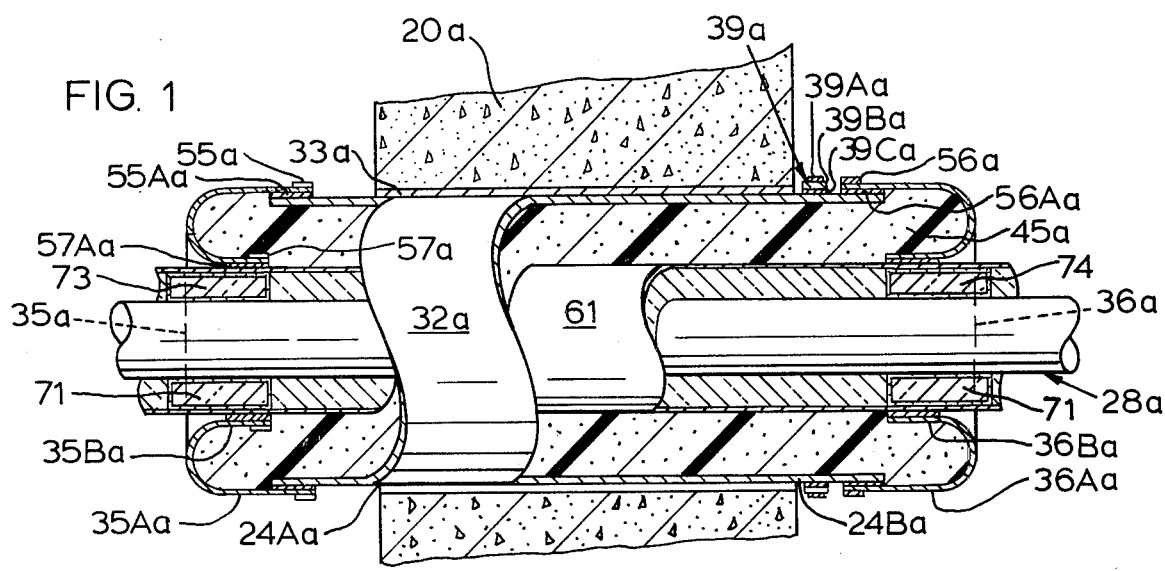
FIG. 1 is a cross-sectional view with parts shown in elevation and with parts broken away showing a shielding structure embodying the invention.
Figure 2:
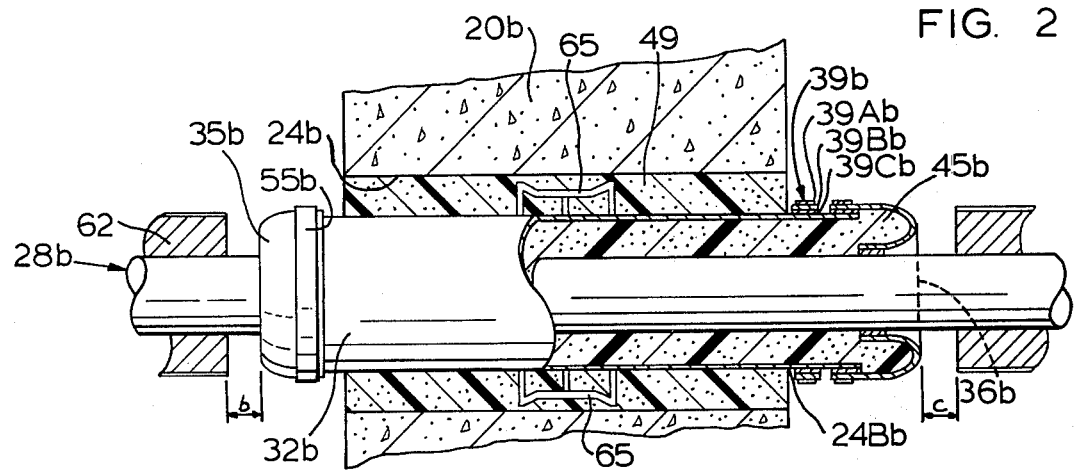
FIG. 2 is a view similar to FIG. 1 but showing an alternate embodiment of the invention.

Referring now to FIG. 2, the invention is shown as applied to a penetration 24b in a structure 20b which is more than 12 inches (30.48 cm) thick and where there is 4 inches (10.16 cm) or more difference between the diameter of the penetration 24b and the diameter of the penetrating member 28b. (Note: Analogous structures to those in FIGS. 3-6 in alternate embodiments shown in FIGS. 1, 2, 7 and 8 are noted by use of the same number with an "a", "b" "c", or "d" added respectively.) Rather than fill the entire opening with a gel material, it may be economically more feasible to reduce the effective opening size with other materials such as concrete, leaded silicon elastomer, silicone foam, etc. To accomplish this, a collar or sleeve 32b is fabricated out of 16 gauge galvanized sheet metal. The collar 32b should be slightly larger than the diameter of member 28b plus its total lateral and up-and-down movement. The annulus 49 thus created between the collar 32b and the structure 20b can be filled with a less expensive material. The collar 32b is anchored in this less expensive material by way of tangs 65 welded, in quadrants, to the sheet metal collar 32b.

Referring to FIGS. 1 and 2, the invention is shown as applied to moving members 28a and 28b having thermal insulation 61 and anti-sweat insulation 62, respectively, attached thereto.

Where thermal insulation 61 is attached or covers the member 28a the entire strip under the gel seal may be removed. However, if the pipe reaches temperatures which may harmfully effect the gel material, 2 inch (5.08 cm) wide sections 71 and 72 are removed at those portions of the insulation 61 lying adjacent to the moving member portions of the boot 35Ba and 36Ba, as in FIG. 1.

The removed sections 71 and 72 are coated on all exposed surfaces 73 and 74 with an insulation cement, such as Carborundum Brand "LDS Moldable Alumina-Silica High Temperature Insulation Cement" or Forty-Eight Insulation Brand "super 48 Cement", a high temperature insulation cement. The removed sections 71 and 72 are then replaced while the cement is still wet and before boot portions 35Ba and 36Ba are attached to the member 28a.

Where cold or anti-sweat insulation 62 is attached to the member 28a, as shown in FIG. 2, the insulation 62 must be permanently removed from the member 28b for the entire length lying between the boots 35b and 36b plus the adjacent distances b and c on both sides of the architectural barrier 20b, such distances being at least equal to the axial movement of the member 28b.

Figure 5:
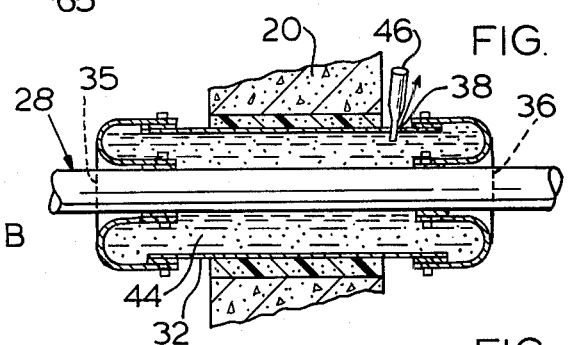
FIG. 5 is a view similar to FIGS. 3 and 4 but showing the injection of liquid silicone gel into the cavity.

Returning to FIG. 4, 2 ports or openings 37 and 38, both located on top of the collar 32 are formed on the same side of the architectural structure 20 to allow for entry and charging of the uncured liquid gel 44 and for ventilation of the otherwise sealed cavity 40 during the charging. The gel 44, then being in a liquid state, is injected into the cavity 40 through one of the two ports or openings 37 or 38 with the other opening venting the cavity 40 during the filling operation. A sufficient quantity of the liquid gel 44 is injected to completely fill the cavity 40 as is shown in FIG. 5.

For openings 24c located in floors 20c, as in FIG. 7, the top boot 35c is not installed until after the gel is injected into the cavity. As a result 2 ports or openings are not required for floor openings. Also, cavities located in floors 20c need not be completely filled with the gel 45c since the weight of the material acts as a force which directs the material and permits it to migrate as a member 28c moves.

The liquid gel 44 may consist of any jelly-like substance formed by the coagulation of a colloidal solution into a solid phase, such as a silicone gel, a silicate gel, and acqueous gels. The gel may be unaltered i.e., as supplied by the material manufacturer, or it may have filler materials which enhance the fire retardance or radiation attenuation properties of the material. For example, a suitable selection is Dow Corning #Q3-6527 Di-elective Gel.

In applications which require radiation shielding properties, pulverized lead and silica sand may be added to the formula to increase its density to a minimum of 147 pounds per cubic foot (2.35 gm/cm$^3$). At this density, it is equal to the density of the concrete which is used in the radiation-shielding architectural barriers. The sand is the lightest component of the formula or mixture and is used to keep the pulverized lead in suspension while the gel is in its uncured state.

Figure 6:
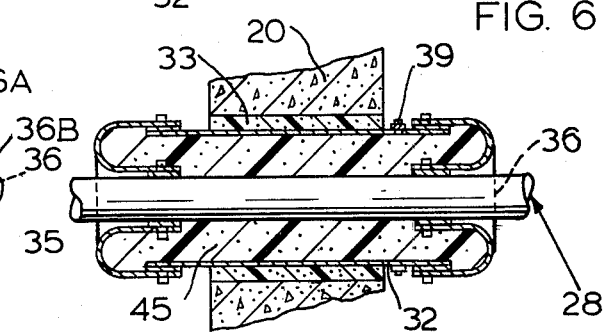
FIG. 6 is a view similar to FIGS. 3-5 and showing the final form of the article formed by the invention.

FIG. 6 depicts the now filled cavity 40 upon or during the cure of the liquid gel 44 into a semi-solid gel 45. The cure time varies with the different gels. With reference to silicone gel, depending upon catalyzation and temperature, the cure time may vary from a matter of minutes to as long as 1 to 2 weeks. Depending upon ambient and substrate temperatures, either additional catalyst may be added to the gel formula or the liquid formula may be heated to temperatures which range from 60° to 250° F. (13°–121° C.) to hasten the cure time of the material. A quickened cure time is desirable since it reduces the amount of liquid, (uncured), gel weight pressure against the boots which reduces the possibility of personal injuries due to boot failure. Dow Corning #1107 Fluid or Dow Corning #Q3-6559 Fluid have been selected as being suitable catalysts.

Upon curing, the openings 37 and 38 are sealed with a patch 39, (see FIG. 6). As shown in FIGS. 1 and 2, the patches 39a and 39b consist of a clamp 39Aa and 39b biasing flexible sheet forms 39Ba and 39Bb coated with a layer of adhesive cement 39Ca and 39Cb against the collar 32a and 32b respectively.

As in FIG. 6 the penetration 24 now has a pocket of gel 45. When silicone gel is used herewith, the embodiment can be provided as a seal which can withstand the ASTM E-119 time/temperature test, (including the applicable hose stream test), for installation in three-hour rated fire walls. This is also true where leaded silicone gel is used.

In an alternate embodiment, this invention is useful for sealing a breach between movable architectural barriers for example, a gap in a joint. As shown in FIG. 8, a breach or gap 24d is formed between barriers 20Ad and 20Bd. Metal strips 64 and 65 are fastened to the sides of the barriers after first attaching a sheet-form material to the bottom portions 64B, 65B of each strip 64 and 65, forming a lower boot 36d. A layer of cement may be used to secure these connections. It is also possible to use a mechanical fastening device.

A liquid gel is received in the trough formed by the metal strips 64 and 65 and the lower boot 36d, and cures into a semi-solid gel 45a. The seal is completed with the attachment of a sheet-form material to the top portion of each strip 64A and 65A, forming an upper boot 35d. A seal is thereby formed which permits movement, due to expansion or seismic tremors for example, while maintaining the integrity of the seal.

While we have disclosed an exemplary method and structures to illustrate the principles of the invention, it should be understood that we wish to embody within the scope of the patent warranted hereon all such modifications as reasonably and properly come within the scope of our contribution to the art.

We claim as our invention

1. Apparatus for sealing a breach having inner and outer openings formed in an architectural barrier which comprises:
   a collar having two open ends adapted to be affixed to portions of an architectural barrier adjacent to the breach in said barrier, said collar projecting outwardly therefrom in at least one of the openings;
   a resilient, flexible, sheet-form member circumferentially wrapped around the collar portion adjacent each outer opening of said collar;
   means locking said sheet-form member in a sealed-together relationship with adjoining portions of said collar;
   means maintaining said sheet-form member in a radially inward-extending position to form a bellows-type boot and together with said collar forming an enclosed cavity; and
   a quantity of gel material disposed within and filling said cavity to form a pocket of the gel,
   whereby the entire breach is sealed with a flexible barrier providing a deformable seal.

2. Apparatus as defined in claim 1 and further comprising:
   a movable member adapted to move in said breach and extending through said collar, inner ends of said boot being wrapped around said moving member; and
   sealing means locking said boot in a sealed-together relationship with said movable member;
   whereby a pocket of the gel material is formed surrounding said member providing a seal while permitting movement of the member.

3. Apparatus as defined in claim 1 wherein said collar is affixed to and projects perpendicularly from opposite sides of a breach in a wall.

4. An apparatus for sealing a breach in an architectural barrier which comprises:
   a joint between at least two architectural barrier members;
   a collar having two open ends affixed to and projecting perpendicularly from said joint;
   a resilient, flexible, sheet-form member attached to and enclosing each of said open ends to form a cavity;
   means locking said sheet-form member in a sealed together relationship with adjoining portions of said collar; and
   a gel material disposed within and predominantly filling said cavity formed by the collar and sheet-form members,
   whereby a flexible seal is formed within said joint permitting limited movement of said architectural barrier members.

5. An apparatus for sealing a breach formed in an architectural barrier which comprises:
   a wall with a breach having inner and outer openings and forming a penetration therein;
   a collar adapted to be affixed to and project from at least one of said openings;
   a resilient, flexible, sheet-form member for each opening of the penetration, each sheet-form member being circumferentially wrapped around the collar at corresponding ends and having portions extending radially inwardly of said collar to form a boot;
   means locking said sheet-form member in a sealed-together relationship with adjoining portions of said collar;
   a member adapted to move in said penetration and extending through said collar, inner ends of said boot being wrapped around said moving member, sealing means locking said boot in sealed-together relationship with said moving member whereby the moving member, the collar, and the boot form a cavity; and
   a gel material being disposed within and filling said cavity form by the collar in the boot,
   whereby a pocket of the silicon gel is formed providing a seal while permitting movement of the member.

6. An apparatus as described in claim 5 wherein said gel material is a silicon gel.

7. Apparatus as defined in claim 6 and further characterized by:
   said silicon gel having a density of at least 147 pounds per cubic foot whereby low level radiation is absorbed by the silicone gel.

8. Apparatus as defined in claim 5, and further characterized by:
   support means between said collar and the penetration in the shielding structure for holding said collar in firm assembly with the shielding structure and together therewith forming an annular space surrounding said collar; and an annulus of silicone foam filling said annular space and forming a shield around said collar to reduce the effective size of the penetration.

9. Apparatus as defined in claim 5 and further characterized by:

an expanding clamp abutting the interior of said collar and biasing said collar against the adjoining walls of the shielding structure at said penetration; and an adhesive sealant applied to the exterior of said collar to seal and said collar in the shielding structure.

10. Apparatus as defined in claim 5 wherein said collar is provided in two parts, each being attached to and projecting outwardly therefrom a separate opening of the penetration.

11. Apparatus as defined in claim 5 wherein the means of locking said sheet-form member and the means of locking said boot in a sealed together relationship with said collar and said moving member respectively consist of a clamp and an adhesive sealant.

12. A method of insulating a mechanical penetration in a shielding structure which comprises:

securing, on each side of the shielding structure, a resilient and flexible sheet-form member circumferentially to a collar, which projects axially from the penetration, and to the mechanical member, thus sealing the penetration and forming a cavity;

providing a pathway for injection and ventilation of the cavity;

filling the sealed penetration with silicone gel; and curing the silicone gel, thereby providing a pocket of viscous material which permits movement of the member while maintaining the continuity of insulation provided by the shielding structure.

13. An insulating method as described in claim 12 which comprises the additional steps of:

anchoring the collar to the walls of the penetration; and packing silicone foam in the annular space surrounding said collar, whereby the effective size of the penetration is reduced to the size of the collar.

14. An insulating method as described in claim 13 wherein the filling step includes:

injecting the silicone gel into the cavity through one side thereof; and ceasing the injection when the leaded silicone gel begins to exude from the other side to insure complete filling of the cavity.

* * * * *